(12) United States Patent
Kim et al.

(10) Patent No.: US 10,266,101 B2
(45) Date of Patent: Apr. 23, 2019

(54) TERMINAL FIXED LAMP SWITCH FOR PARKING BRAKE

(71) Applicant: DONGWOUN INDUSTRIAL CO., LTD., Ansan-si, Gyeonggi-do (KR)

(72) Inventors: Ho Jin Kim, Anyang-si (KR); Tae Won Yoon, Suwon-si (KR); Su Hyeon Han, Ansan-si (KR)

(73) Assignee: DONGWOUN INDUSTRIAL CO., LTD., Ansan-si (KR)

( * ) Notice: Subject to any disclaimer, the term of this patent is extended or adjusted under 35 U.S.C. 154(b) by 0 days.

(21) Appl. No.: 15/830,120

(22) Filed: Dec. 4, 2017

(65) Prior Publication Data

US 2018/0162263 A1     Jun. 14, 2018

(30) Foreign Application Priority Data

Dec. 9, 2016  (KR) .................. 10-2016-0167879
Dec. 19, 2016 (KR) .................. 10-2016-0173560

(51) Int. Cl.
| | |
|---|---|
| *H01H 13/18* | (2006.01) |
| *B60Q 1/00* | (2006.01) |
| *B60Q 3/82* | (2017.01) |
| *B60T 7/10* | (2006.01) |
| *H01H 21/24* | (2006.01) |

(Continued)

(52) U.S. Cl.
CPC ............. *B60Q 1/0076* (2013.01); *B60Q 3/16* (2017.02); *B60Q 3/82* (2017.02); *B60T 7/042* (2013.01); *B60T 7/102* (2013.01); *B60T 8/00* (2013.01); *B60T 8/88* (2013.01); *B60T 17/22* (2013.01); *G05G 1/04* (2013.01); *H01H 13/18* (2013.01); *H01H 13/52* (2013.01); *H01H 21/24* (2013.01); *H01H 13/186* (2013.01); *H01H 2225/012* (2013.01); *H01H 2235/01* (2013.01)

(58) Field of Classification Search
CPC ...... H01H 21/24; H01H 21/28; H01H 21/285; H01H 2225/012; H01H 13/803; H01H 13/18; H01H 13/186; H01H 13/52; H01H 13/62; H01H 1/20; H01H 1/2008; H01H 2003/146; B60Q 1/486; B60T 7/102; B60T 7/101

See application file for complete search history.

(56) References Cited

U.S. PATENT DOCUMENTS 4,874,912 A * 10/1989 Kakuta ............... H01H 13/186
                                                 200/16 D
6,284,990 B1 * 9/2001 Arnold .................... F42C 19/06
                                                 102/262

(Continued)

FOREIGN PATENT DOCUMENTS

JP     2000-062528 A   2/2000
JP     4280146 B2      6/2009

(Continued)

*Primary Examiner* — Felix O Figueroa
(74) *Attorney, Agent, or Firm* — Sughrue Mion, PLLC (57) ABSTRACT

A terminal fixed lamp switch for a parking brake and a structure of a lamp switch is configured to be changed, which indicates that a parking brake is pulled as lighting a lamp on an instrument panel of a vehicle by pulling a lever for the parking brake to prevent malfunction due to poor contact of the lamp switch when an external shock occurs, and enhance fuel efficiency and reduce manufacturing cost due to weight reduction.

7 Claims, 4 Drawing Sheets

(51) Int. Cl.
  *B60Q 3/16* (2017.01)
  *H01H 13/52* (2006.01)
  *B60T 8/88* (2006.01)
  *G05G 1/04* (2006.01)
  *B60T 7/04* (2006.01)
  *B60T 8/00* (2006.01)
  *B60T 17/22* (2006.01)

(56) References Cited

U.S. PATENT DOCUMENTS 6,924,449 B2 * 8/2005 Duchemin ........... H01H 1/2008
                                                    200/16 A
7,585,183 B2 * 9/2009 Shimazu ............ H01H 11/0018
                                                    439/530
9,218,926 B1 * 12/2015 Pierce .................... H01H 1/26

FOREIGN PATENT DOCUMENTS

KR       10-1405323 B1    6/2014
KR       10-1758260 B1    7/2017

* cited by examiner

FIG. 4B [OFF]

TERMINAL FIXED LAMP SWITCH FOR PARKING BRAKE

CROSS-REFERENCE TO RELATED APPLICATIONS

This application claims priority to and the benefit of Korean Patent Application Nos. 10-2016-0167879 and 10-2016-0173560 filed in the Korean Intellectual Property Office on Dec. 9 & 19, 2016, respectively, the entire contents of which are incorporated herein by reference.

TECHNICAL FIELD

The present invention relates to a terminal fixed lamp switch for a parking brake, and more particularly, to a terminal fixed lamp switch for a parking brake which a structure of a lamp switch is configured to be changed, which indicates that a parking brake is pulled as lighting a lamp on a instrument panel of a vehicle by pulling a lever for the parking brake to prevent malfunction due to poor contact of the lamp switch when an external shock occurs, enhance fuel efficiency and reduce manufacturing cost due to weight reduction, and reduce the number of assembled fixtures.

BACKGROUND ART

In general, a driver uses a parking brake lever or a parking brake pedal to prevent a vehicle from moving on a slope when parking the vehicle.

When the parking brake lever or the parking brake pedal operate as described above, it is necessary to determine whether a parking brake is applied or whether the parking brake is not applied by detecting sensing the operation in the vehicle.

For example, when the vehicle travels after the vehicle is changed from a P-stage (parking state) to a D-stage (driving state) while the parking brake is applied, since the vehicle is in an abnormal traveling state, the vehicle needs to detect the abnormal traveling state to guide the abnormal traveling state to a driver.

To this end, a switch for the parking brake which interlocks with the operation of the parking brake lever or the parking brake pedal is applied into the vehicle.

A general switch for the parking brake in the related art is a structure constituted by a shaft, a bracket, a spring, a first terminal, and a second terminal and the shaft when the parking brake lever or the parking brake pedal operates interlocks with the parking brake lever or the parking brake pedal.

In this case, since the shaft moves in direct contact with the bracket made of metal, noise due to perturbation between the shaft and the bracket occurs. When the shaft is made of a metallic material, the noise caused due to the perturbation between the shaft and the bracket is generated louder.

Further, in the parking brake switch in the related art, there is a possibility that defects will be caused due to misassembly as the shaft, the spring, the first terminal, and the second terminal are assembled with the bracket as a reference configuration.

In order to solve the problems, a parking brake switch has been filed in Korean Patent Application No. 10-2012-0139661.

The parking brake switch in the related art includes a shaft interlocked with the operation of the parking brake lever or parking brake pedal, a spring that provides elastic restoring force to the shaft while interlocking with the operation of the shaft, a bracket having a first terminal for flow of electricity, the first terminal having a second terminal for the flow of the electricity, the second terminal for connecting or disconnecting the first terminal and the second terminal according to the position of the shaft after being coupled with a lower end of the shaft, and a base for supporting at least one of the shaft, the spring, the bracket, the first terminal, and the second terminal and the base is configured to include a guide shape for supporting positional movement of the shaft so as to prevent a portion where the bracket and the first terminal contact each other from being generated during the positional movement of the shaft and supporting the positional movement of the shaft.

However, in the general parking brake switch in the related art, which is configured as described above, the second terminal is coupled to the lower end of the shaft to connect or disconnect the first terminal and the second terminal according to the position of the shaft, and as a result, the switch is exposed to the outside according to the position on the bottom surface of the base, so that when the parking brake in which the switch for parking brake is fixed and installed is delivered, the switch is easily damaged when the parking brake falls or is externally shocked, and as a result, contact failure occurs.

In addition, as described above, since the general parking brake switch in the related art includes the first terminal for the flow of the electricity and the bracket made of a single piece of brass so as to be fixed to the base, a weight of the entire parking brake switch may increase, and as a result, fuel cost is lowered and manufacturing cost increases.

SUMMARY OF THE INVENTION

Accordingly, the present invention is contrived to address the problems, and an object of the present invention is to provide a lamp switch for a parking brake, in which a connection switch provided to connect or disconnect a ground terminal for a ground terminal and a ground terminal of a connection terminal is configured to be installed inside a support member to respond to a positional change of a shaft by actuating a parking brake lever and the connection switch is not thus exposed to the outside of the support member, and as a result, when the parking brake in which the switch for parking brake is fixed and installed is delivered, the connection switch can be prevented from being damaged during actuation when the parking brake falls or is externally shocked, and as a result, poor contact occurs, thereby preventing contact failure.

Further, the present invention is contrived to address the problems and another object of the present invention is to provide a lamp switch for a parking brake, in which since the connection terminal is fixed to the support member via a fixation holder member molded of a synthetic resin material, a separate fixation piece for fixing the connection terminal to the support member can be excluded to a weight is reduced, and as a result, fuel efficiency can be enhanced and manufacturing cost can be lowered.

Other objects of the present invention will be apparent as the description proceeds.

An exemplary embodiment of the present invention provides a terminal fixed lamp switch for a parking brake, including a support member provided with one end being fixable to a parking brake via a fixation member; ground and connection terminals provided with a ground terminal and a connection terminal each having one end supported on the support member; a movable shaft in which one end is suspended on the fixation holder member and the support member via a separation preventing member through the fixation holder member and the support member and the other end is provided to be vertically movable in response to an operation of a parking brake lever; a connection switch formed to make the movable shaft penetrate the center to be positioned inside the support member and provided so that both ends are connected with the ground terminal and the connection terminal which are partially exposed; and a restoration spring in which one end is supported onto a bottom surface of the connection switch and the other end is supported on the support member to connect the connection switch with the ground terminal and the connection terminal when the parking brake is actuated and provided to provide restoration force of the movable shaft by making the movable shaft penetrate the center.

According to an exemplary embodiment of the present invention, in a terminal fixed lamp switch for a parking brake, since a connection switch is not exposed to the outside of a support member, when a switch for a parking brake in which the switch for the parking brake is fixed and installed is delivered, the connection switch can be prevented from being damaged during actuation when the parking brake falls or is externally shocked, and as a result, contact failure does not occur, fuel efficiency can be enhanced and manufacturing can be lowered by reducing a weight.

DETAILED DESCRIPTION

Hereinafter, an exemplary embodiment of a terminal fixed lamp switch for a parking brake according to the present invention will be described in detail.

First, among drawings, it should be noted that same constituent elements or components are represented by the same reference numerals. In describing the present invention, a detailed description of known functions and configurations incorporated will be omitted so as to avoid obscuring the gist of the present invention.

As illustrated, a terminal fixed lamp switch for a parking brake according to the present invention is configured so that a connection switch provided to connect or disconnect a ground terminal for a ground terminal and a ground terminal of a connection terminal is configured to be installed inside a support member and the connection switch is not thus exposed to the outside, and as a result, the connection switch may be prevented from being damaged and a weight may be reduced.

Figure 1:
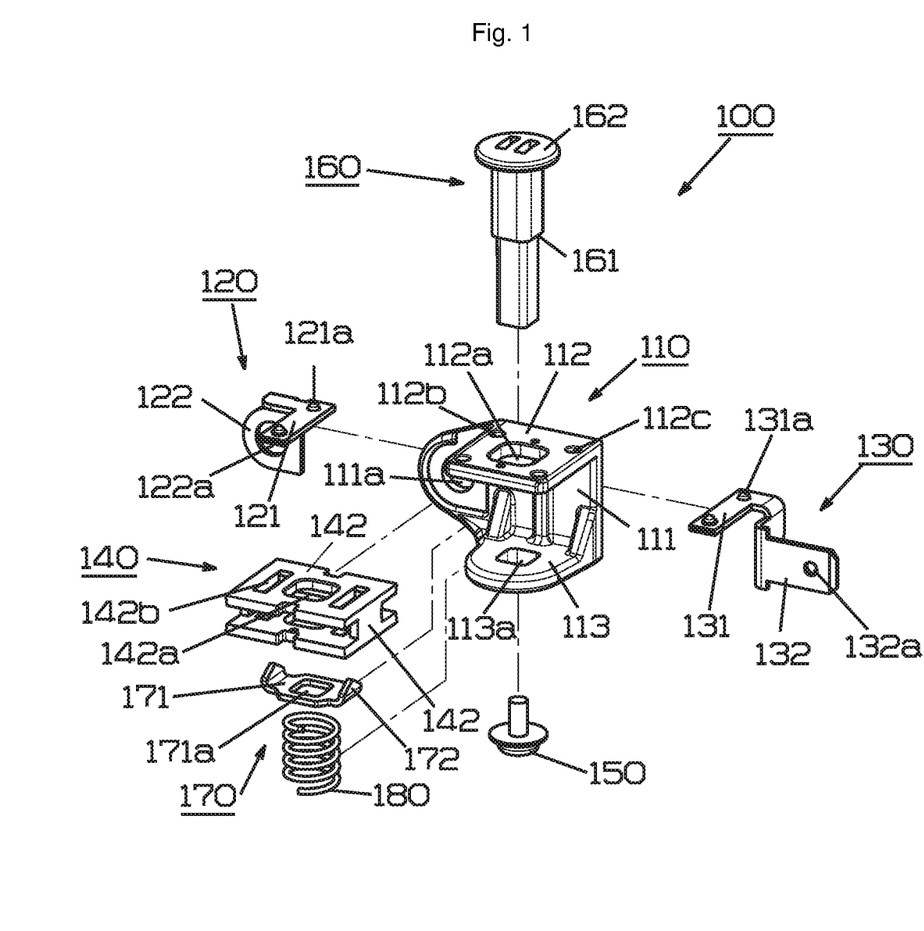
FIG. 1 is an exploded perspective view of a terminal fixed lamp switch for a parking brake according to the present invention.
Figure 2:
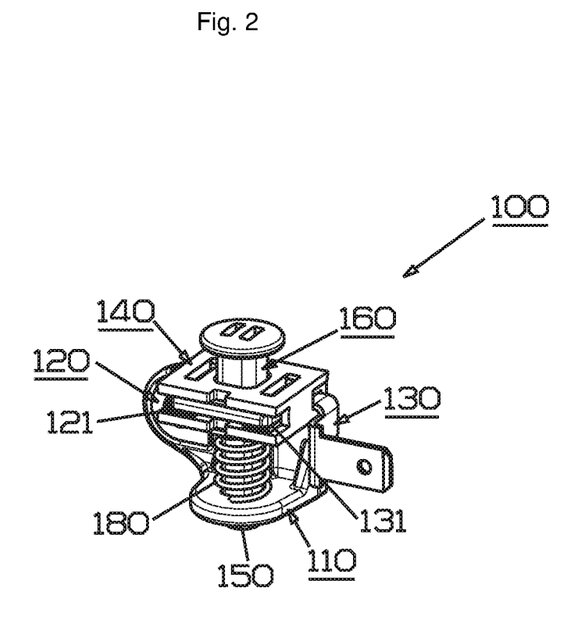
FIG. 2 is a combination perspective view of the terminal fixed lamp switch for a parking brake according to the present invention.
Figure 3:
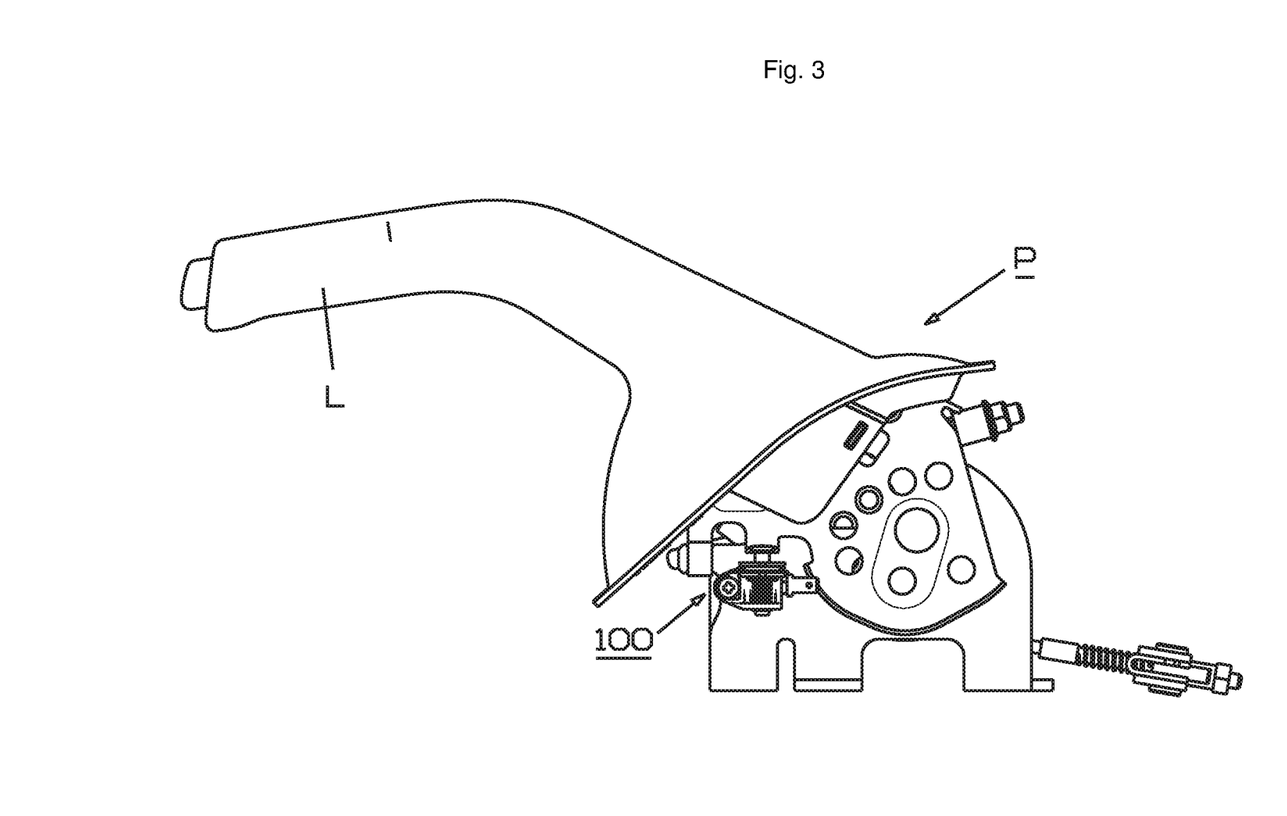
FIG. 3 is a diagram illustrating a state in which the terminal fixed lamp switch for a parking brake is installed in the parking brake according to the present invention.

That is, the terminal fixed lamp switch 100 for a parking brake according to the present invention includes, as illustrated in FIGS. 1 to 3 which are accompanied, a support member 110 provided with one end being fixable to a parking brake P (see FIG. 3) via a fixation member (reference numeral is omitted) constituted by a bolt and a nut; ground and connection terminals 120 and 130 provided with a ground terminal 121 and a connection terminal 131 each having one end supported on the support member 110; a movable shaft 160 in which one end is suspended on the fixation holder member 140 and the support member 110 via a separation preventing member 150 through the fixation holder member 140 and the support member 110 and the other end is provided to be vertically movable in response to an operation of a parking brake lever L; a connection switch 170 formed to make the movable shaft 160 penetrate the center to be positioned inside the support member 110 and provided so that both ends are connected with the ground terminal 121 and the connection terminal 131 which are partially exposed; and a restoration spring 180 in which one end is supported onto a bottom surface of the connection switch 170 and the other end is supported on the support member 110 to connect the connection switch 170 with the ground terminal 121 and the connection terminal 131 when the parking brake P is actuated and provided to provide restoration force of the movable shaft 160 by making the movable shaft 160 penetrate the center.

Herein, the ground and connecting terminals 120 and 130 and the connection switch 170 are made of brass so as to be electrically connected to each other and the supporting member 110 and the fixation holder member 140 are made of a synthetic resin material for weight reduction and electrically insulation.

Hereinafter, the terminal fixed lamp switch for a parking brake according to the present invention will be described below in more detail with reference to the accompanying drawings.

First, the support member 110 of the terminal fixed lamp switch for a parking brake according to the present invention is formed to fix the ground and connection terminals 120 and 130 via the fixation holder member 140, and provided to prevent the connection switch 170 installed on the movable shaft 160 from being exposed to the outside by guiding the movable shaft 160.

That is, as illustrated in FIGS. 1 and 2, the support member 110 includes a fixation plate 111 having a fixation hole 111a formed at one side thereof to be fixed to a parking brake P via a fixation member constituted by a bolt and a nut and upper and lower guide plates 112 and 113 which are bent and extended from an upper end and a lower end of the fixation plate 111 in one direction, in which the ground terminal 121 of the ground terminal 120 and the connection terminal 131 of the connection terminal 130 are formed at one side and the other side in a plate shape and upper and lower guide through-holes 112a and 113a having a polygonal shape are formed on the plate, respectively so as to penetrate one end of the movable shaft 160.

Further, positioning ground and connection holes 112b and 112c are further formed as a pair at one side and the other side of the upper guide through-hole 112a formed on the upper guide plate 112 of the support member 110, respectively so as to prevent swing at the time of fixing the ground terminal 121 and the connection terminal 131 of the ground and connection terminals 120 and 130 via the fixation holder member 140.

In addition, a movement preventing protrusion 111b is further provided at one side of the fixation hole 111a formed on the fixation plate 111 to protrude so as to prevent movement by positioning the ground terminal 120.

As illustrated in FIGS. 1 to 2, the ground terminal 120 is provided in such a manner that one side of the bottom surface of the upper guide plate 112 formed on an upper end of the fixation plate 111 of the support member 110 and the other end is supported on the fixation plate 111 with the fixation hole 111a and one side is fixed to the fixation plate 111 via the fixation member to implement the terminal fixed lamp switch 100 for a parking brake in a contact state or non-contact state by a current position of the movable shaft 160.

That is, the ground terminal 120 includes the ground terminal 121 positioned on one side of the bottom surface of the upper guide plate 112 formed on the upper end of the fixation plate 111 of the support member 110 and formed to be fixable via the fixation holder member 140 and a ground fixation plate 111a bent and extended from the ground terminal 121 in one direction and fixed to the fixation plate 111 with the fixation hole 111a via the fixation member and a pair of ground fixation protrusion 121a are formed on a top surface of the ground terminal 121 to protrude so as to be inserted into a pair of positioning connection holes 112b formed at one side of the upper guide plate 112 and a ground fixation hole 122a is formed on the ground fixation plate 122 so as to be fixed to the fixation plate 111 via the fixation member by matching the fixation hole 111a.

Further, a movement preventing hole (reference numeral is omitted) is formed at one side of the ground fixation hole 122a so as to prevent the ground terminal 120 from moving from the fixation plate 111 by penetration by the movement preventing protrusion 111b.

As illustrated in FIGS. 1 to 2, the connection terminal 130 is provided in such a manner that one end is supported on the other side of the bottom surface of the upper guide plate 112 formed on the upper end of the fixation plate 111 of the support member 110 and the other end is connected with a connection connector provided for flow of electricity.

That is, the connection terminal 130 includes the ground terminal 131 positioned on the other side of the bottom surface of the upper guide plate 112 formed on the upper end of the fixation plate 111 of the support member 132 and formed to be fixable via the fixation holder member 140 and a connection plate 132 bent and extended from the connection terminal 131 in one direction and drilled with a connection hole 132a so as to connected with a connection connector provided for a flow of electricity and a pair of connection fixation protrusion 131a are formed on the top surface of the connection terminal 131 to protrude so as to be inserted into a pair of positioning connection holes 112c formed at the other side of the upper guide plate 112.

The connection switch 170 installed on the movable shaft 160 is provided to be connected to and disconnected from the ground terminal 121 and the connection terminal 131 by moving the connection switch 170 installed on the movable shaft 160 in a vertical direction while fixing the ground terminal 121 and the connection terminal 131 onto the bottom surface of the upper guide plate 112 of the support member 110 by positioning each one end, that is, the ground terminal 121 and the connection terminal 131 of the ground and connection terminal 120 and 130 on both sides of the bottom surface of the upper guide plate 112 of the support member 110.

That is, as illustrated in FIGS. 1 and 2, the fixation holder member 140 includes fixation holder plates 142 vertically spaced apart from each other and with both lateral surfaces connected by a connection piece 141 so as to insert the upper guide plate 112 of the support member 110 on which the ground terminal 121 and the connection terminal 131 are supported on one side and the other side of the bottom surface and a holder through-hole 142a having the same shape as the upper guide through-hole 112a formed on the upper guide plate 112 is formed on the fixation holder plate 142 and connection holes 142b are formed at both sides of the holder through-hole 142a formed on the fixation holder plate 142 so as to be connected to and disconnected from the ground terminal 121 and the connection terminal 131 by moving the connection switch 170 installed on the movable shaft 160 in a vertical direction.

Herein, the connection hole 142b is formed in a slit shape so that the connection switch 170 is securely connected to the ground terminal 121 and the connection terminal 131 when the connection switch 170 moves upward.

As illustrated in FIGS. 1 and 2 which are accompanied, the movable shaft 160 in which one end is suspended on the fixation holder member 140 and the support member 110 via a separation preventing member 140 through the fixation holder member 140 and the support member 110 and the other end is provided to be contactable or non-contactable in response to an operation of a parking brake lever L.

That is, the movable shaft 160 is provided in such a manner that one end has a polygonal cross-section so as not to rotate by penetrating a holder through-hole 142a formed in the fixation holder member 140 and the polygonal upper and lower guide through-holes 112a and 113a formed on the upper and lower guide plates 112 and 113, a step portion 151 is formed in a middle part so as to suspend the connection switch 170, a screw groove (not illustrated) is formed on one bottom surface so as to fix the separation preventing member 150 by a screw coupling scheme, and a suspension piece 162 for preventing the separation is formed on the other end.

The connection switch 170 is located inside the support member 110 by making the movable shaft 160 penetrate the center and provided in such a manner that one end is supported on the restoration spring 170 and the other end is connected to and disconnected from the bottom surfaces of the ground terminal 121 and the connection terminal 131 through a connection hole 142b formed on a fixation holder plate 142 of a fixation holder member 140 in response to the operation of the parking brake.

The connection switch 170 includes a connection movable plate 171 in which a polygonal connection movable hole 171a is drilled at the center so as to penetrate one end of the movable shaft 160 and be suspended to the step portion 151 and a connection piece 172 formed by a triangular cross-section so as to be connected to and disconnected from the bottom surfaces of the ground terminal 121 and the connection terminal 131 which are bent and extended from both ends of the connection movable plates 161 upward, respectively from both ends of the connection movable plate 171 through a connection hole 142b formed on the fixation holder plate 142 of the fixation holder member 140.

When a driver pulls the parking brake lever L for parking while the parking lamp switch 100 for a parking brake according to the present invention is fixed to the parking brake via a fixation member such as a bolt and a nut, the ground terminal 121 and the connection terminal 131 are connected to each other while the connection switch 170 moves up by the restoration spring 180 as illustrated in FIGS. 1 to 4A and 4B.

Figure 4A:
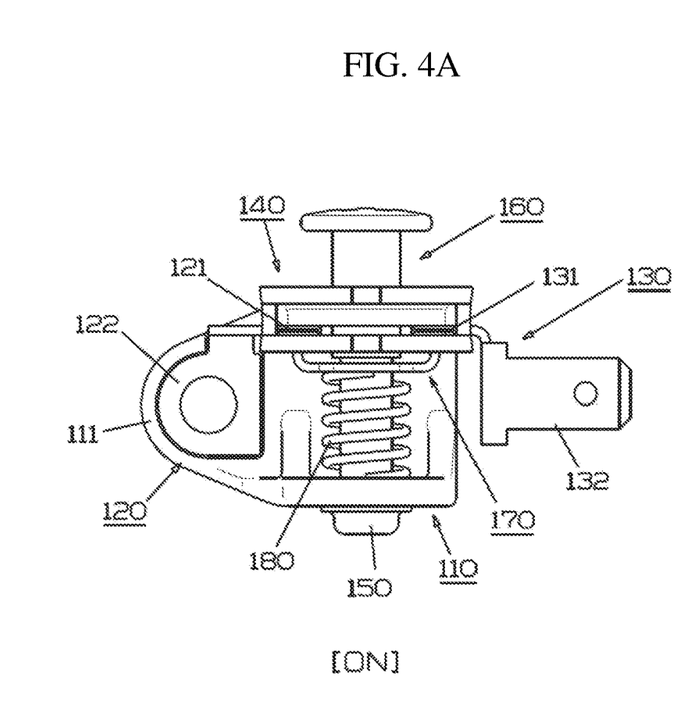
FIGS. 4A and 4B are diagrams illustrating operation states of the terminal fixed lamp switch for a parking brake according to the present invention.
Figure 4B:
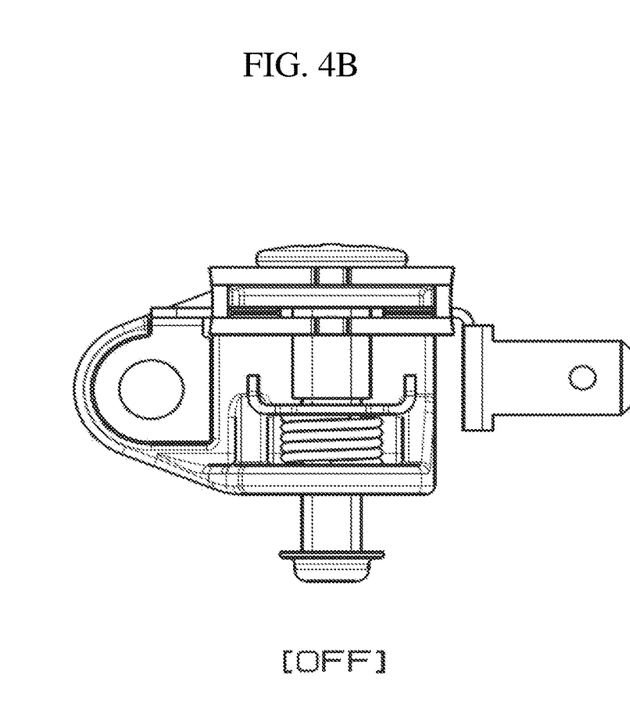

More specifically, a state before pulling the parking brake lever L as a state in which a contact plane of the parking brake presses the other end of the movable shaft 160 to compress the restoration spring 180 installed on the movable shaft 160 and move down the connection switch 170 downward and in this case, the ground terminal 121 and the connection terminal 131 are not connected to each other as illustrated in FIG. 4B.

In this case, when the driver pulls the parking brake lever L, the movable shaft 160 pressed by the contact plane of the parking brake is released, and as a result, the movable shaft 160 moves upward by the restoration spring 180.

Similarly thereto, the connection piece 172 of the connection switch 170 is connected to each of the ground terminal 121 and connection terminal 131 inserted and exposed through the connection hole 142b formed on the fixation holder plate 142 of the fixation holder member 140.

As a result, a lamp provided on an instrumental panel of the vehicle is lighted to announce to the driver that the parking brake is actuated.

Since the connection switch 170 of the terminal fixed lamp switch for a parking brake according to the present invention is not exposed to the outside but positioned inside the support member 110, the connection switch 170 may be prevented from being easily damaged due to external force.

The above description just illustrates the technical spirit of the present invention and various changes and modifications can be made by those skilled in the art to which the present invention pertains without departing from an essential characteristic of the present invention. Therefore, the exemplary embodiments of the present invention are provided for illustrative purposes only but not intended to limit the technical concept of the present invention. The scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A terminal fixed lamp switch for a parking brake, comprising:
    a support member (110) provided with one end being fixable to a parking brake (P) via a fixation member;
    ground and connection terminals (120, 130) provided with a ground end (121) and a connection end (131) each having one end supported on the support member (110);
    a fixation holder member (140) fixing the ground end (121) and the connection end (131) of the ground and connection (120, 130) with one end being inserted and engaged into the support member (110) and provided to be partially exposed;
    a movable shaft (160) in which one end is suspended on the fixation holder member (140) and the support member (110) via a separation preventing member (150) through the fixation holder member (140) and the support member (110) and the other end is provided to be vertically movable in response to an operation of a parking brake lever (L);
    a connection switch (170) formed to make the movable shaft (160) penetrate a center to be positioned inside the support member (110) and provided so that both ends are connected with the ground end (121) and the connection end (131) which are partially exposed; and
    a restoration spring (180) in which one end is supported onto a bottom surface of the connection switch (170) and the other end is supported on the support member (110) to connect the connection switch (170) with the ground end (121) and the connection end (131) when the parking brake (P) is actuated and provided to provide restoration force of the movable shaft (160) by making the movable shaft (160) penetrate the center,
    wherein the fixation holder member (140) includes fixation holder plates (142) vertically space apart from each other and with both lateral surfaces connected by a connection piece (141) so as to insert an upper guide plate (112) of the support member (110) on which the ground end (121) and the connection end (131) are supported on one side and the other side of the bottom surface and a holder through-hole (142a) having the same shape as an upper guide through-hole (112a) formed on the upper guide plate (112) is formed on the fixation holder plate (142) and connection holes (142b) are formed at both sides of the holder through-hole (142a) formed on the fixation holder plate (142) so as to be connected to and disconnected from the ground end (121) and the connection end (131) by moving the connection switch (170) installed on the movable shaft (160) in a vertical direction.

2. The terminal fixed lamp switch for a parking brake of claim 1, wherein the support member (110) includes a fixation plate (111) having a fixation hole (111a) formed at one side thereof to be fixed to the parking brake (P) via a fixation member and upper and lower guide plates (112, 113) which are bent and extended from an upper end and a lower end of the fixation plate (111) in one direction and have a plate shape, in which upper and lower guide through-holes (112a, 113a) having a polygonal shape are formed on the plate, respectively so as to be penetrated by one end of the movable shaft (160).

3. The terminal fixed lamp switch for a parking brake of claim 2, wherein positioning ground and connection holes (112b, 112c) are further formed as a pair at one side and another side of the upper guide through-hole (112a) formed on the upper guide plate (112) of the support member (110), respectively so as to prevent swing at a time of fixing the ground end (121) and the connection end (131) of the ground and connection terminals (120, 130) via the fixation holder member (140) and a movement preventing protrusion (111b) is further provided at one side of the fixation hole (111a) formed on the fixation plate (111) to protrude so as to prevent movement by positioning the ground terminal (120).

4. The terminal fixed lamp switch for a parking brake of claim 1, wherein the connection switch (170) includes a connection movable plate (171) in which a polygonal connection movable hole (171a) is drilled at the center so as to penetrate one end of the movable shaft (160) and be suspended to a step portion (151) and a connection piece (172) formed so as to be connected to and disconnected from the bottom surfaces of the ground end (121) and the connection end (131) which are bent and extended from both ends of the connection movable plates (161) upward, respectively from both ends of the connection movable plate (171) through a connection hole (142b) formed on the fixation holder plate (142) of the fixation holder member (140).

5. A terminal fixed lamp switch for a parking brake, comprising:
    a support member (110) provided with one end being fixable to a parking brake (P) via a fixation member;
    ground and connection terminals (120, 130) provided with a ground end (121) and a connection end (131) each having one end supported on the support member (110);
    a fixation holder member (140) fixing the ground end (121) and the connection end (131) of the ground and connection terminals (120, 130) with one end being inserted and engaged into the support member (110) and provided to be partially exposed;
    a movable shaft (160) in which one end is suspended on the fixation holder member (140) and the support member (110) via a separation preventing member (150) through the fixation holder member (140) and the support member (110) and the other end is provided to be vertically movable in response to an operation of a parking brake lever (L);

a connection switch (170) formed to make the movable shaft (160) penetrate a center to be positioned inside the support member (110) and provided so that both ends are connected with the ground end (121) and the connection end (131) which are partially exposed; and a restoration spring (180) in which one end is supported onto a bottom surface of the connection switch (170) and the other end is supported on the support member (110) to connect the connection switch (170) with the ground end (121) and the connection end (131) when the parking brake (P) is actuated and provided to provide restoration force of the movable shaft (160) by making the movable shaft (160) penetrate the center, wherein the ground terminal (120) includes the ground end (121) positioned on one side of a bottom surface of an upper guide plate (112) formed on an upper end of a fixation plate (111) of the support member (110) and formed to be fixable via the fixation holder member (140) and a ground fixation plate (122) bent and extended from the ground end (121) in one direction and fixed to the fixation plate (111) with the fixation hole (111a) via the fixation member and a pair of ground fixation protrusion (121a) are formed on a top surface of the ground end (121) to protrude so as to be inserted into a pair of positioning connection holes (112b) formed at one side of the upper guide plate (112) and a ground fixation hole (122a) is formed on the ground fixation plate (122) so as to be fixed to the fixation plate (111) via the fixation member by matching the fixation hole (111a).

6. The terminal fixed lamp switch for a parking brake of claim 5, wherein a movement preventing hole is formed at one side of the ground fixation hole (122a) so as to prevent the ground terminal (120) from moving from the fixation plate (111) by penetration by the movement preventing protrusion (111b).

7. A terminal fixed lamp switch for a parking brake, comprising:

a support member (110) provided with one end being fixable to a parking brake (P) via a fixation member;

ground and connection terminals (120, 130) provided with a ground end (121) and a connection end (131) each having one end supported on the support member (110);

a fixation holder member (140) fixing the ground end (121) and the connection end (131) of the ground and connection terminals (120, 130) with one end being inserted and engaged into the support member (110) and provided to be partially exposed;

a movable shaft (160) in which one end is suspended on the fixation holder member (140) and the support member (110) via a separation preventing member (150) through the fixation holder member (140) and the support member (110) and the other end is provided to be vertically movable in response to an operation of a parking brake lever (L);

a connection switch (170) formed to make the movable shaft (160) penetrate a center to be position inside the support member (110) and provided so that both ends are connected with the ground end (121) and the connection end (131) which are partially exposed; and a restoration spring (180) in which one end is supported onto a bottom surface of the connection switch (170) and the other end is supported on the support member (110) to connect the connection switch (170) with the ground end (121) and the connection end (131) when the parking brake (P) is actuated and provided to provide restoration force of the movable shaft (160) by making the movable shaft (160) penetrate the center, wherein the connection terminal (130) includes the connection end (131) positioned on the other side of a bottom surface of an upper guide plate (112) formed on an upper end of a fixation plate (111), of the support member (110) and formed to be fixable via the fixation holder member (140) and a connection plate (132) bent and extended from the connection end (131) in one direction and drilled with a connection hole (132a) so as to connected with a connection connector provided for a flow of electricity and a pair of connection fixation protrusion (131a) are formed on a top surface of the connection end (131) to protrude so as to be inserted into a pair of positioning connection holes (112c) formed at the other side of the upper guide plate (112).

* * * * *